UNITED STATES PATENT OFFICE.

WILFRED M. HANDY, OF SPOKANE, WASHINGTON.

PROCESS FOR PRODUCING REFRACTORY COMPOUNDS.

1,330,263.     Specification of Letters Patent.     Patented Feb. 10, 1920.

No Drawing.     Application filed June 3, 1918. Serial No. 237,970.

*To all whom it may concern:*

Be it known that I, WILFRED M. HANDY, a citizen of the United States, residing at Spokane, in the county of Spokane and State of Washington, have invented certain new and useful Improvements in Processes for Producing Refractory Compounds, of which the following is a specification.

The present invention relates to an improved process of producing a refractory composition, the composition being especially intended for a refractory material, and the process being carried out in the operation of forming a lining for the interior walls of a furnace, by the heat from the furnace.

The primary object of the invention is the provision of a process of manufacturing a refractory material especially adapted for a furnace lining at a comparatively low cost of production, and in which there is a very high quality of cementation and self bonding, thus providing a refractory material especially fitted for the purpose of lining the walls of a furnace. The invention contemplates a composition which is laid on or plastered against the walls of a furnace while in a pulverized and moistened, or plastic condition which will set as a cement, and then under the subsequent action of an intense heat in the furnace will vitrify into a dense, homogeneous mass of a basic nature, especially adapted as a lining for furnaces to resist the corrosive action of molten metals, slags and gases.

Hereinafter I have set forth one complete example of the physical embodiment of the invention, with a slight variation or modification thereof, in which the best modes for the practical applications of the principles of the invention are set forth, and which have proven highly satisfactory and successful in actual practice.

In carrying out the process of manufacturing the composition I utilize as the essential components or ingredients magnesia, iron oxid, and silica, and while I have used these ingredients in varying proportions, one specific formula as used may be set forth as follows:

| | |
|---|---|
| Magnesia | 86 per cent. |
| Iron oxid | 8 " " |
| Silica | 6 " " |

A composition of this formula and in substantially this proportion is especially suitable for lining certain metallurgical furnaces, such as are employed in the production of steel, copper, etc.

I have discovered that a compound of iron oxid with an acid radical, such as iron carbonate, iron sulfate, iron chlorid, etc., when heated in contact with magnesium oxid, will unite and form a dense and strong compound of the desired proportions of iron and magnesia. I prefer to take calcined magnesia low in iron, powder it, and then mix with it the iron sulfate, either in solution, or in solid form, and this moistened mixture will quickly set to a fairly strong cement. It is very essential that the structure of the lining composition be uniform, inasmuch as its fusibility varies greatly with the iron content, the fusion point rapidly lowering as the iron increases, while if the iron content is very low, the composition becomes very friable and is subject to rapid disintegration. This uniformity of the structure may be attained with facility and accuracy in the process of mixing the ingredients, and it is therefore possible to apply this mixture in the form of a plaster or plastic cement, to the interior walls of the furnace to be lined, allow the coating or lining to set, and then fire up the furnace and thus sinter the lining into place by the heat from the furnace.

I have also found it possible to spread out a layer of calcined magnesia upon a tight floor, and pour over it a sufficient quantity of iron sulfate to give any iron content desired. This mixture, if allowed to stand and dry will harden to a solid crust which may then be broken up in small pieces, and calcined in any of the usual ways, the temperature required being from 2800 to 3000 degrees F.

If desired, the composition may be made into briquets after having been either sintered in loose form in a rotary kiln to a hard clinker, or made into briquets, allowed to set and harden, and then stacked in a brick kiln and there burned at a high temperature for several days, or, the hardened briquet may be sintered in an upright kiln, either by feeding the fuel in solid form with the charge, or by firing through fire boxes or vents near the base of the kiln.

In some instances iron carbonate or iron sulfid may be used in place of the sulfate or other compound of iron with equally good results as far as the production of a ferro-magnesite is concerned, but this mixture does not have the good cementing properties of the magnesia-iron-salt mixture or composition.

I have also found by actual use that a salt of some other metal than iron may be employed, and a mixture of calcined magnesite, iron oxid and a salt of magnesium, such as the chlorid or sulfate will set as a cement and when sufficiently heated will combine to form a good ferro-magnesite, which however does not produce as inexpensive a product as is secured by using the iron salt. Silica affects the fusibility slightly, but greatly aids in forming a stronger and tougher composition, but an excess of silica is objectionable because of its tendency to increase slag losses. Few deposits of natural magnesium minerals possess sufficient proportions of these substances when calcined, and in the few which do approach the desired compound in composition, the proportion of iron is extremely variable, and it is difficult to produce from such material furnace linings with a uniform composition and dependable qualities.

The immense deposits of crystalline magnesite in Stevens county, Washington, contain silica very uniformly distributed in proportions especially suitable for the highest grade refractories, but the iron content is uniformly low, generally averaging about three per cent. in the calcined substance. There needs to be added but 4 to 6 per cent. of iron oxid to produce the ideal refractory.

I claim—

The process of making a basic refractory material which consists in pulverizing and mixing calcined magnesite, iron compound and silica, and calcining the mixture in a kiln, to cause the oxides of magnesium and iron to unite.

In testimony whereof I affix my signature.

WILFRED M. HANDY.